US012665858B2

(12) United States Patent
Jeon et al.

(10) Patent No.:  US 12,665,858 B2
(45) Date of Patent:      Jun. 23, 2026

(54) METHOD AND APPARATUS FOR TRANSMITTING ETHERNET FRAME, AND STORAGE MEDIUM STORING INSTRUCTIONS TO PERFORM METHOD FOR TRANSMITTING ETHERNET FRAME

(71) Applicant: Research & Business Foundation SUNGKYUNKWAN UNIVERSITY, Suwon-si (KR)

(72) Inventors: Jae Wook Jeon, Suwon-si (KR); Youngsoo Do, Suwon-si (KR); Sung Bhin Oh, Suwon-si (KR); Minho Kim, Suwon-si (KR); Jonghun Kim, Suwon-si (KR); Jungju Lee, Suwon-si (KR); Jaebum Park, Suwon-si (KR); Minkyu Kim, Suwon-si (KR); Hyeongkeun Hong, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 261 days.

(21) Appl. No.: 18/400,237

(22) Filed: Dec. 29, 2023

(65) Prior Publication Data

US 2024/0250915 A1      Jul. 25, 2024

(30) Foreign Application Priority Data

Dec. 29, 2022    (KR) ......................... 10-2022-0189536

(51) Int. Cl.
*H04L 47/6275*       (2022.01)
*H04L 12/66*         (2006.01)
(52) U.S. Cl.
CPC .......... *H04L 47/6275* (2013.01); *H04L 12/66* (2013.01)

(58) Field of Classification Search
CPC ......... H04L 12/66; H04L 47/22; H04L 47/24; H04L 47/28; H04L 47/628; H04L 47/6215; H04L 47/6275; H04L 47/245
(Continued)

(56) References Cited

U.S. PATENT DOCUMENTS

2014/0341032 A1* 11/2014 Thaler ................. H04L 47/2433
                                                    370/235
2019/0199641 A1*  6/2019 Lo Bello ................. H04L 47/22
2022/0321493 A1* 10/2022 Rollet ..................... H04L 47/24

FOREIGN PATENT DOCUMENTS

WO       2022/254759 A1    12/2022

OTHER PUBLICATIONS

Request for the Submission of an Opinion for Korean Patent Application No. 10-2022-0189536, dated Jan. 5, 2026.

* cited by examiner

*Primary Examiner* — Harun Chowdhury

(57)              ABSTRACT

There is provided a gateway device. The gateway device comprises a communication unit configured to transmit and receive ethernet frames including a plurality of ethernet data, a memory configured to store instructions; and a processor configured to execute the instructions stored in the memory, wherein the instructions, when executed by the processor, cause the processor to check priority information on each ethernet data included in the ethernet frames, and control a transmission order of the first ethernet frame with the highest priority, a transmission order of the second ethernet frame with the priority lower than that of the first ethernet frame among ethernet frames, a transmission cycle of the second ethernet frame, and whether to perform preemption of the second ethernet frame based on the priority information.

14 Claims, 13 Drawing Sheets

(58) Field of Classification Search
USPC .............................. 370/230.1, 235, 328, 329
See application file for complete search history.

| | |
|---|---|
| RECEIVE ETHERNET FRAMES | ~S900 |

| | |
|---|---|
| CONTROL TRANSMISSION ORDER OF THE DATA BASED ON PRIORITY INFORMATION ON THE DATA INCLUDED IN THE ETHERNET FRAME | ~S910 |

| | |
|---|---|
| OUTPUT A TRANSMISSION FRAME BASED ON THE TRANSMISISON ORDER | ~S920 |

METHOD AND APPARATUS FOR TRANSMITTING ETHERNET FRAME, AND STORAGE MEDIUM STORING INSTRUCTIONS TO PERFORM METHOD FOR TRANSMITTING ETHERNET FRAME

This work was supported by National Research Foundation of Korea (NRF) grant funded by the Korea government (MSIT; Ministry of Science and ICT) (Research For Real-time Scene Understanding Technology in Complex Traffic Situations and Adverse Weather Conditions (No. 2020R1A2C3011286)).

TECHNICAL FIELD

The present disclosure relates to a device and a method for transmitting ethernet frames and more specifically, to a device and a method capable of reducing the occurrence of frame preemption during transmission of ethernet frames.

BACKGROUND

As vehicles of today are adopting software-based control methods employing Electronic Control Units (ECUs), vehicle reliability and performance are improving, but at the same time, the vehicle network structure is becoming complex accordingly. Recently, central gateway-type networks are being employed in vehicles, and the network architecture is transitioning from a domain-based network structure to a zone-based network structure.

The IEEE 802.1 group has announced the Time-Sensitive Networking (TSN) specification to address the needs of vehicle network systems. The TSN specification employs the IEEE 802.1Qav, IEEE 802.1Qbv, and IEEE 802.1Qbu protocols to achieve limited (low) latency. Among these, to use the IEEE 802.1 Qav protocol, it is essential to estimate the guard band. If frame length is long or transmission time is insufficient, the corresponding frame may cross over the guard band and enter a scheduled traffic area scheduled for the transmission of control data.

When the Time-Aware Shaper (TAS) algorithm is used to ensure periodicity, zero loss, and zero delay of control data, a guard band is inevitably used. The guard band refers to a time interval (unused time interval) in which no information is transmitted to distinguish frames. However, if data such as video, audio, and text are transmitted using the Credit-Based Shaper (CBS) algorithm, and the frame length is long and transmission begins near the end of a frame transmission cycle, the transmitted frame may cross beyond the guard band and enter the control data area of the next transmission cycle. Since control data is sensitive to loss or delay, situations like the one described above should be avoided. However, if the guard band is extended to prevent a case where a frame crosses over the guard band and enters the control data area, the waiting time may become unnecessarily elongated during the frame transmission, thereby reducing the utilization rate of the network system. It is efficient to use a frame preemption function to minimize the guard band; however, when the frame preemption function is used, additional processing time is required to split a frame or reassemble split frames. Also, overhead is incurred due to the addition of a frame header to reassemble split frames. Therefore, to increase network efficiency, a method is required, which not only minimizes unused areas in the guard band but also reduces the occurrence of frame preemption.

SUMMARY

A technical object of the present disclosure is to provide a device and a method for transmitting ethernet frames capable of improving the transmission efficiency of a network.

Another technical object of the present disclosure is to provide a device and a method for transmitting ethernet frames capable of minimizing the number of occurrences of frame preemption during the transmission of ethernet frames.

Yet another technical object of the present disclosure is to provide a device and a method for transmitting ethernet frames capable of minimizing unused areas in a guard band.

The aspects of the present disclosure are not limited to the foregoing, and other aspects not mentioned herein will be clearly understood by those skilled in the art from the following description.

In accordance with an aspect of the present disclosure, there is provided a gateway device, the device comprises: a communication unit configured to transmit and receive a plurality of ethernet frames including a plurality of ethernet data; a memory configured to store one or more instructions; and a processor configured to execute the one or more instructions stored in the memory, wherein the instructions, when executed by the processor, cause the processor to: check priority information on each ethernet data included in the plurality of ethernet frames, determine a first ethernet frame with the highest priority and a second ethernet frame with a priority lower than that of the first ethernet frame among the plurality of ethernet frames based on the priority information, transmit the first ethernet frame in a first transmission cycle, and control the second ethernet frame to be transmitted in the first transmission cycle if time required for transmitting the second ethernet frame is shorter than the remaining time obtained after transmission of the first ethernet frame in the first transmission cycle, and determine whether to perform preemption of the second ethernet frame based on priority information of the ethernet data of the second ethernet frame if the time required for transmitting the second ethernet frame is longer than the remaining time of the first transmission cycle.

Herein, if the time required for transmitting the second ethernet frame is longer than the remaining time of the first transmission cycle and the priority of the ethernet data of the second ethernet frame is higher than a predetermined value, the processor may be configured to perform the preemption of the second ethernet frame.

Additionally, if the time required for transmitting the second ethernet frame is longer than the remaining time of the first transmission cycle and the priorities of the ethernet data of the second and third ethernet frames are lower than the predetermined value, the processor may be configured to transmit the third ethernet frame before transmitting the second ethernet frame as the time required for transmitting the third ethernet frame is shorter than a predetermined first threshold.

Herein, the predetermined first threshold may be set based on an average value of data size at which the preemption occurs.

Additionally, the priority of the ethernet data of the second ethernet frame may be the same as the priority of the ethernet data of the third ethernet frame.

Additionally, if the time required for transmitting the third ethernet frame is shorter than the remaining time of the first transmission cycle, the processor may be configured to control the third ethernet frame to be transmitted within the first transmission cycle, and if the time required for transmitting the third ethernet frame is longer than the remaining time of the first transmission cycle, the processor may be configured to compare the time required for transmitting the third ethernet frame with a predetermined second threshold and determines whether to perform preemption of the third ethernet frame.

Herein, the predetermined second threshold may be set to at least 120 bytes.

Additionally, the processor may be configured to perform the preemption of the third ethernet frame as the time required for transmitting the third ethernet frame is longer than or equal to the predetermined second threshold, and control the third ethernet frame to be transmitted in a transmission cycle after the first transmission cycle as the time required for transmitting the third frame is shorter than the predetermined second threshold.

In accordance with another aspect of the present disclosure, there is provided a data transmission method performed by a gateway device including a memory and a processor, the method comprises: receiving a plurality of ethernet frames, each of which includes a plurality of ethernet data; determining a first ethernet frame with the highest priority and a second ethernet frame with a priority lower than that of the first ethernet frame among the plurality of ethernet frames based on priority information on each ethernet data included in the plurality of ethernet frames; transmitting the first ethernet frame including the first ethernet data in a first transmission cycle; and transmitting the second ethernet frame including the second ethernet data, wherein the transmitting the second ethernet data includes controlling the second ethernet frame to be transmitted in the first transmission cycle if time required for transmitting the second ethernet frame is shorter than the remaining time obtained after transmitting the first ethernet frame in the first transmission cycle, and determining whether to perform preemption of the second ethernet frame based on priority information of the ethernet data of the second ethernet frame if the time required for transmitting the second ethernet frame is longer than the remaining time of the first transmission cycle.

In accordance with an another aspect of the present disclosure, there is provided a gateway device, the device comprises: a communication unit configured to transmit and receive a plurality of ethernet frames including ethernet data; a memory configured to store one or more instructions; and a processor configured to execute the one or more instructions stored in the memory, wherein the instructions, when executed by the processor, cause the processor to: check at least one of priority information and length information on each ethernet data included in the plurality of ethernet frames, store each ethernet data according to priorities of a plurality of buffers based on the at least one of priority information and length information, transmit a first ethernet frame including ethernet data stored in a first buffer with the highest priority among the plurality of buffers within a first transmission cycle, transmit a second ethernet frame including ethernet data stored in a second buffer with a priority lower than that of the first buffer among the plurality of buffers, if time required for transmitting the second ethernet frame is shorter than the remaining time obtained after transmitting the first ethernet frame in the first transmission cycle and the time required for transmitting the second ethernet frame is longer than the remaining time, determine whether to perform preemption of the second ethernet frame based on the size of ethernet data stored in the second buffer.

In accordance with another aspect of the present disclosure, there is provided a data transmission method performed by a gateway device including a memory and a processor, the method comprises: receiving a plurality of ethernet frames including each ethernet data; storing each ethernet data according to priorities of a plurality of buffers based on priority information on each ethernet data included in the plurality of ethernet frames; transmitting a first ethernet frame including ethernet data stored in a first buffer with the highest priority among the plurality of buffers; and transmitting a second ethernet frame including ethernet data stored in a second buffer with a priority lower than that of the first buffer among the plurality of buffers, wherein the transmitting the second ethernet data includes: controlling the second ethernet frame to be transmitted in the first transmission cycle if time required for transmitting the second ethernet frame is shorter than the remaining time obtained after transmitting the first ethernet frame in the first transmission cycle, and determining whether to perform preemption of the second ethernet frame based on priority information of the ethernet data of the second ethernet frame if the time required for transmitting the second ethernet frame is longer than the remaining time of the first transmission cycle.

In accordance with another aspect of the present disclosure, there is provided a computer program including computer executable instructions stored in a non-transitory computer readable storage medium, wherein the instructions, when executed by a processor, cause the processor to perform a data transmission method, the method comprises: receiving a plurality of ethernet frames including each ethernet data; storing each ethernet data according to priorities of a plurality of buffers based on priority information on each ethernet data included in the plurality of ethernet frames; transmitting a first ethernet frame including ethernet data stored in a first buffer with the highest priority among the plurality of buffers; and transmitting a second ethernet frame including ethernet data stored in a second buffer with a priority lower than that of the first buffer among the plurality of buffers, wherein the transmitting the second ethernet data includes: controlling the second ethernet frame to be transmitted in the first transmission cycle if time required for transmitting the second ethernet frame is shorter than the remaining time obtained after transmitting the first ethernet frame in the first transmission cycle, and determining whether to perform preemption of the second ethernet frame based on priority information of the ethernet data of the second ethernet frame if the time required for transmitting the second ethernet frame is longer than the remaining time of the first transmission cycle.

In accordance with another aspect of the present disclosure, there is provided a non-transitory computer readable storage medium storing computer program including computer executable instructions, wherein the instructions, when executed by a processor, cause the processor to perform a data transmission method, the method comprises: receiving a plurality of ethernet frames including each ethernet data; storing each ethernet data according to priorities of a plurality of buffers based on priority information on each ethernet data included in the plurality of ethernet frames; transmitting a first ethernet frame including ethernet data stored in a first buffer with the highest priority among the plurality of buffers; and transmitting a second ethernet frame including ethernet data stored in a second buffer with a priority lower than that of the first buffer among the plurality of buffers, wherein the transmitting the second ethernet data includes: controlling the second ethernet frame to be transmitted in the first transmission cycle if time required for transmitting the second ethernet frame is shorter than the remaining time obtained after transmitting the first ethernet frame in the first transmission cycle, and determining whether to perform preemption of the second ethernet frame based on priority information of the ethernet data of the second ethernet frame if the time required for transmitting the second ethernet frame is longer than the remaining time of the first transmission cycle.

According to one embodiment of the present disclosure, the number of occurrences of frame preemption during the transmission of ethernet frames is minimized, thereby decreasing overhead and improving transmission efficiency.

According to one embodiment of the present disclosure, the number of frame preemption performed by a gateway device is reduced, thereby reducing the load on a processor within the gateway device.

According to one embodiment of the present disclosure, unused areas in a guard band are minimized, thereby reducing the transmission delay of a frame.

DETAILED DESCRIPTION

Figure 1:
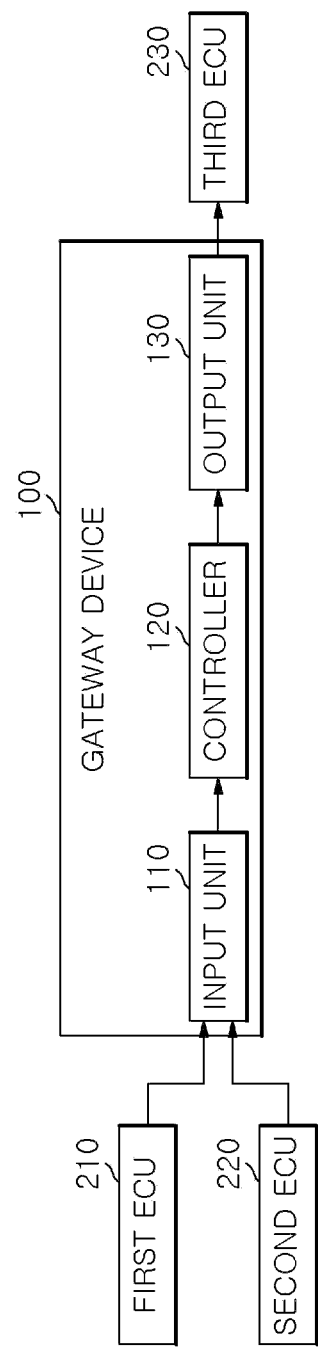
FIG. 1 illustrates a gateway device according to one embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 illustrates a gateway device according to one embodiment of the present disclosure.

Referring to FIG. 1, a gateway device 100 comprises an input unit 110, a controller 120, and an output unit 130. FIG. 1 illustrates an example in which the gateway device 110 receives ethernet frames from a first ECU 210 and a second ECU 220 and outputs ethernet frames to a third ECU 230; however, the gateway device 100 may also receive ethernet frames from a plurality of devices within a network and transmit data within each ethernet frame to the corresponding device.

The input unit 110 may be configured to receive ethernet frames from the first ECU 210 and the second ECU 220 connected by the ethernet network, respectively. In this case, the input unit 110 may include a first input module configured to receive ethernet frames coming from the first ECU 210 and a second input module configured to receive ethernet frames coming from the second ECU 220. The input unit 110 may store data in the ethernet frames received from the first ECU 210 and the second ECU 220 in an input buffer. Here, the buffer may include a queue. If the input buffer is implemented as a queue, it may be referred to as an input queue.

The controller 120 may be configured to control the transmission order of data included in the ethernet frames input to the input unit 110 based on priority information on the corresponding data. For example, the controller 120 may determine the remaining transmission time of the current transmission cycle after transmission of the first transmission frame is completed within the current transmission cycle. If the time required for transmitting the second transmission frame is shorter than the remaining transmission time, the controller 120 may control the second transmission frame to be transmitted within the current transmission period; if the time required for transmitting the second transmission frame is longer than the remaining transmission time, the controller 120 may determine whether to preempt the second transmission frame based on the priority of data within the second transmission frame.

In one embodiment, if the time required for transmitting the second transmission frame is longer than the remaining transmission time and the priority of data within the second transmission frame is higher than a preset value, the controller 120 may perform preemption on the second transmission frame.

If the time required for transmitting the second transmission frame is longer than the remaining transmission time and the priority of data within the second transmission frame is higher than a preset value, the controller 120 may prioritize transmission of a third transmission frame over the second transmission frame. In this case, the priority of the data in the third transmission frame may be lower than the set value, and the size of the data in the third transmission frame may be less than a first threshold. Here, the first threshold may be set based on the average size value of the data for which preemption is performed. The priority of data within the second transmission frame and the priority of data within the third transmission frame may be the same.

Meanwhile, if the time required for transmitting the third transmission frame is shorter than the remaining transmission time of the current transmission cycle, the controller 120 may control the third transmission frame to be transmitted within the current transmission cycle; if the time required to transmit the third transmission frame is longer than the remaining transmission time, the controller 120 may compare the size of the data within the third transmission frame with a second threshold (e.g., the minimum size of data that may be transmitted) to determine whether to preempt the third transmission frame. Here, the second threshold may be set to at least 120 bytes. If the size of data within the third transmission frame is greater than or equal to the second threshold, the controller 120 may perform preemption on the third transmission frame; if the size of data within the third transmission frame is less than the second threshold, the controller 120 may control the third transmission frame to be transmitted in the next transmission cycle of the current transmission cycle or in a transmission cycle after the current transmission cycle.

The output unit 130 may output transmission frames based on the transmission order determined by the controller 120. For example, the output unit 130 may monitor the number of data stored in an output buffer, construct a frame using the data in the output buffer upon confirming the input of data, and output the constructed frame through the ethernet port.

Figure 2:
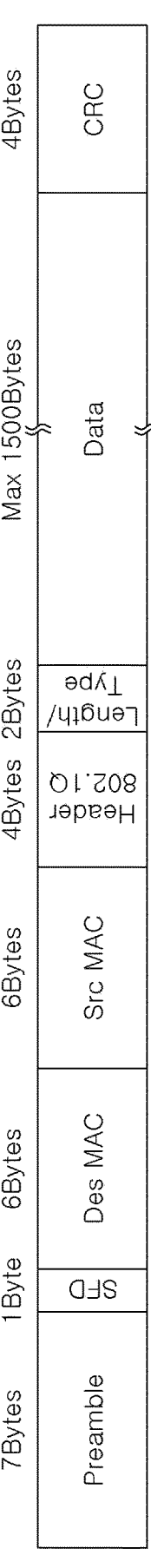
FIG. 2 illustrates a structure of an ethernet frame used in a gateway device according to one embodiment of the present disclosure.

FIG. 2 illustrates a structure of an ethernet frame used in a gateway device according to one embodiment of the present disclosure.

Referring to FIG. 2, the ethernet frame comprises a preamble field, Start of Frame Delimiter (SFD) field, Des MAC field, Src MAC field, 802.1Q header field, length/type field, data field, and Cyclic Redundancy Check (CRC) field.

The preamble field is used for synchronizing a transmitter and a receiver and composed of 7 bytes. The preamble field has a fixed value and may include 7 bit strings, each of which consists of '10101010.'

The SFD field signals the start of an ethernet frame and consists of 1 byte. The SFD field has a fixed value and may be configured to have a value of '10101011.'

The Des MAC field includes the MAC address of a destination and consists of 6 bytes.

The Src MAC field includes the MAC address of a source and consists of 6 bytes.

The 802.1Q header field is used to transfer VLAN ID information between switches on a Virtual Local Area Network (VLAN) and consists of 4 bytes. The 802.1Q header field may be referred to as an 802.1Q tag. The 802.1Q header field includes a 2-byte Tag Protocol IDentifier (TPID) field and a 2-byte Tag Control Information (TCI) field. The TCI field includes a 3-bit Priority Code Point (PCP) field, a 1-bit Canonical Format Indicator (CFI) field, and a 12-bit VLAN ID (VID) field. The PCP field includes information on the priority of data within the data field and is expressed by a value between 0 and 7. Here, a higher number indicates higher priority. For example, if the value of the PCP field is 7, it may indicate that the corresponding data is network control data; if the value of the PCP field is 6, it may indicate that the corresponding data is internetwork control data. Also, if the value of the PCP field is 5, it may indicate that the corresponding data is audio data; if the value of the PCP field is 4, it may indicate that the corresponding data is video data. The default value of the PCP field may be set to 0, which may indicate that the data is text data.

The length/type field represents the network protocol type and the length (number of bytes) of the data field and consists of 2 bytes.

The data field contains a minimum of 42 bytes and a maximum of 1500 bytes of data when the 802.1Q tag is present. The data field may be referred to as payload.

The CRC field is used to detect a frame error and consists of 4 bytes. The CRC field may be referred to as a Frame Check Sequence (FCS) field.

Figure 3:
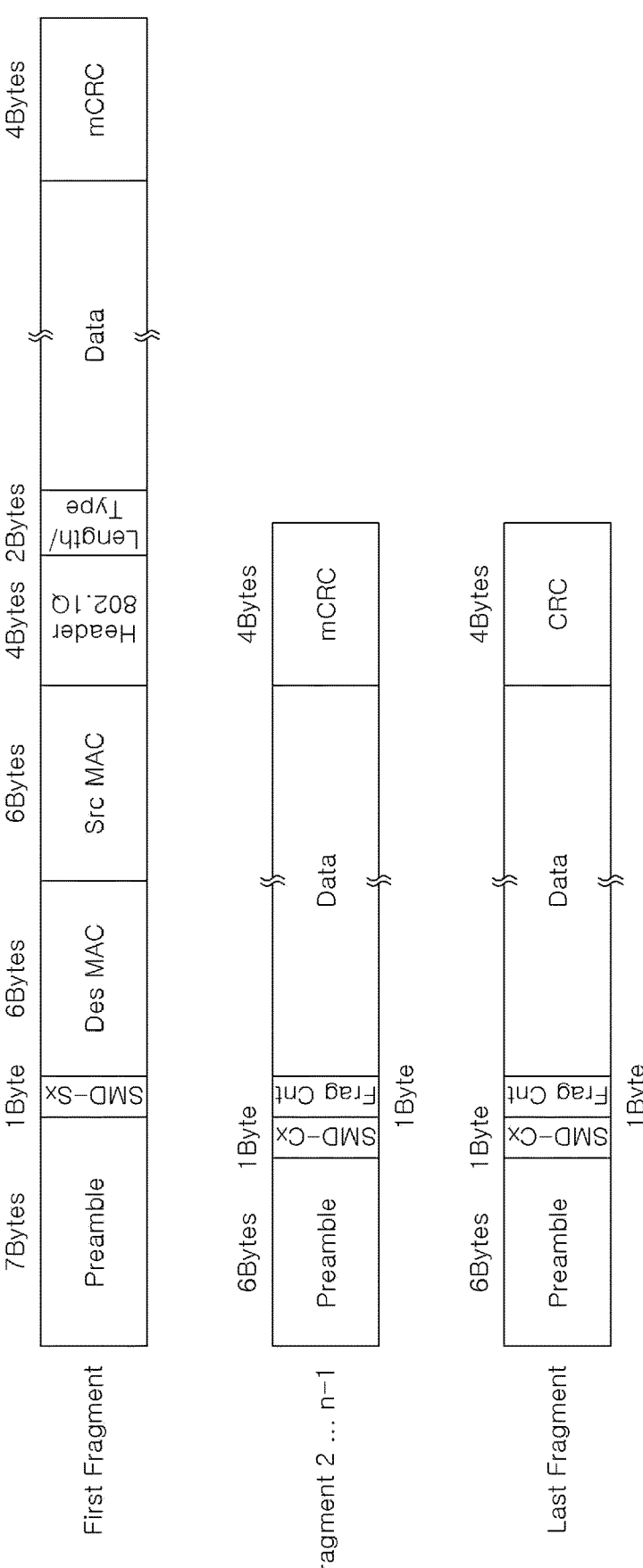
FIG. 3 illustrates a structure of a fragment frame generated when a gateway device according to one embodiment of the present disclosure performs frame preemption.

FIG. 3 illustrates a structure of a fragment frame generated when a gateway device according to one embodiment of the present disclosure performs frame preemption.

When frame preemption is performed, the ethernet frame may be split into a plurality of fragments as shown in FIG. 3.

The first fragment frame refers to the first fragment when a frame is split through frame preemption, and to indicate the fragmentation, the SFD field is changed to the Start Mpacket Delimiter-Start fragment (SMD-Sx) field. The CRC field is changed to the mCRC field indicating that preemption has been applied to the corresponding frame.

For the second to last fragment frames, 1 byte is reduced in the preamble field, and a 1-byte Frag Cnt field is added.

The SMD-Continue fragment (SMD-Cx) field indicates the middle fragment of the split frame, and the Frag Cnt field indicates the fragment number.

Since header information has already been transmitted through the first fragment frame, the second to last fragment frames do not include header information. In other words, the second to last fragment frames do not include the Des MAC field, Src MAC field, 802.1Q header field, and length/type field.

The last fragment frame includes the CRC value of the original frame (frame before splitting). Based on the CRC field, the receiver may know that the corresponding fragment is the last fragment.

The data field of each fragment frame may contain a minimum of 60 bytes and a maximum of 1500 bytes of data.

FIGS. 4 to 8 illustrate a process of determining a transmission order of frames by a gateway device according to one embodiment of the present disclosure.

In what follows, a process of determining a transmission order of data by a gateway device will be descried with reference to FIGS. 4 to 8.

The gateway device may determine the transmission order of each data based on at least one of the priority and size (or length) of each data and transmit a frame containing the corresponding data according to the transmission order. To this end, when receiving an ethernet frame, the gateway device may determine the priority of the corresponding data based on priority information in the 802.1Q header field of the ethernet frame and determine the size (or length) of the corresponding data based on the length information in the length/type field. The gateway device may calculate the time required to transmit a frame containing the corresponding data based on the length information.

Figure 4:
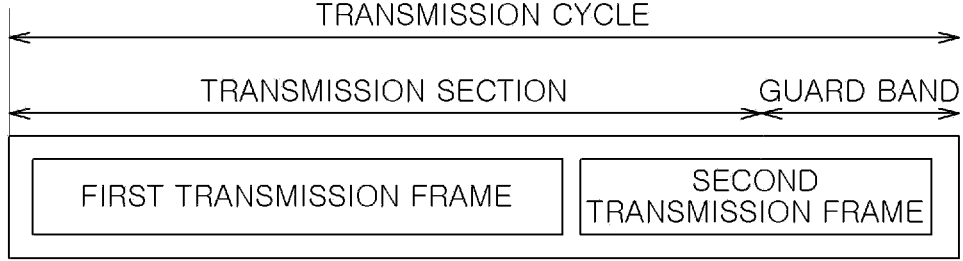
FIGS. 4 to 8 illustrate a process of determining a transmission order of frames by a gateway device according to one embodiment of the present disclosure.

First, referring to FIG. 4, each transmission cycle includes a transmission section and a guard band. Each transmission section may be divided into a scheduled traffic area (or section) and an unscheduled traffic area (general traffic area). The scheduled traffic area may be located at the front of the transmission section. In the scheduled traffic area, data to be transmitted periodically and/or data sensitive to delay, such as control data, may be transmitted. The general traffic area may be located after the scheduled traffic area in the transmission section. In the general traffic area, data relatively insensitive to delay, such as video data, audio data, and text data, may be transmitted. The guard band serves as an area for distinguishing between frames and/or preventing interference, and typically, data is not transmitted to the guard band.

For example, as shown in FIG. 4, when the gateway device attempts to transmit a second transmission frame after transmitting a first transmission frame within the current transmission cycle, the gateway device may determine whether it is possible to transmit the second transmission frame within the remaining transmission time after transmission of the first transmission frame. Here, the priority of the data within the first transmission frame may be higher than or equal to the priority of the data within the second transmission frame. At this time, if the size of the second transmission frame exceeds the quantity that may be transmitted within the transmission section of the current transmission cycle but is less than the limit allowed for transmission within the remaining transmission time including the guard band, the gateway device mag transmit the second transmission frame within the current transmission cycle by utilizing the guard band. To this end, the gateway device may compare the remaining transmission time available after transmission of the first transmission frame within the current transmission cycle and the time required for transmitting the second transmission frame. For example, if an ethernet frame containing data with a size of 100 bytes is to be transmitted, since the size of the remaining fields except the data field is fixed to 30 (=7+1+6+6+4+2+4) bytes, 130 bytes are required for the gateway device to construct a frame containing the corresponding data. Therefore, the gateway device may calculate the time required to transmit a frame with a size of 130 bytes and determine whether the corresponding frame may be transmitted in the current transmission cycle by comparing the calculated time required to transmit the corresponding frame with the remaining transmission time including the guard band. At this time, an interpacket gap of 12 bytes may be additionally introduced. In this case, when determining whether 100 bytes of data may be transmitted within the remaining transmission time, the gateway device may determine whether the corresponding remaining transmission time is enough to transmit 142 bytes.

Figure 5:
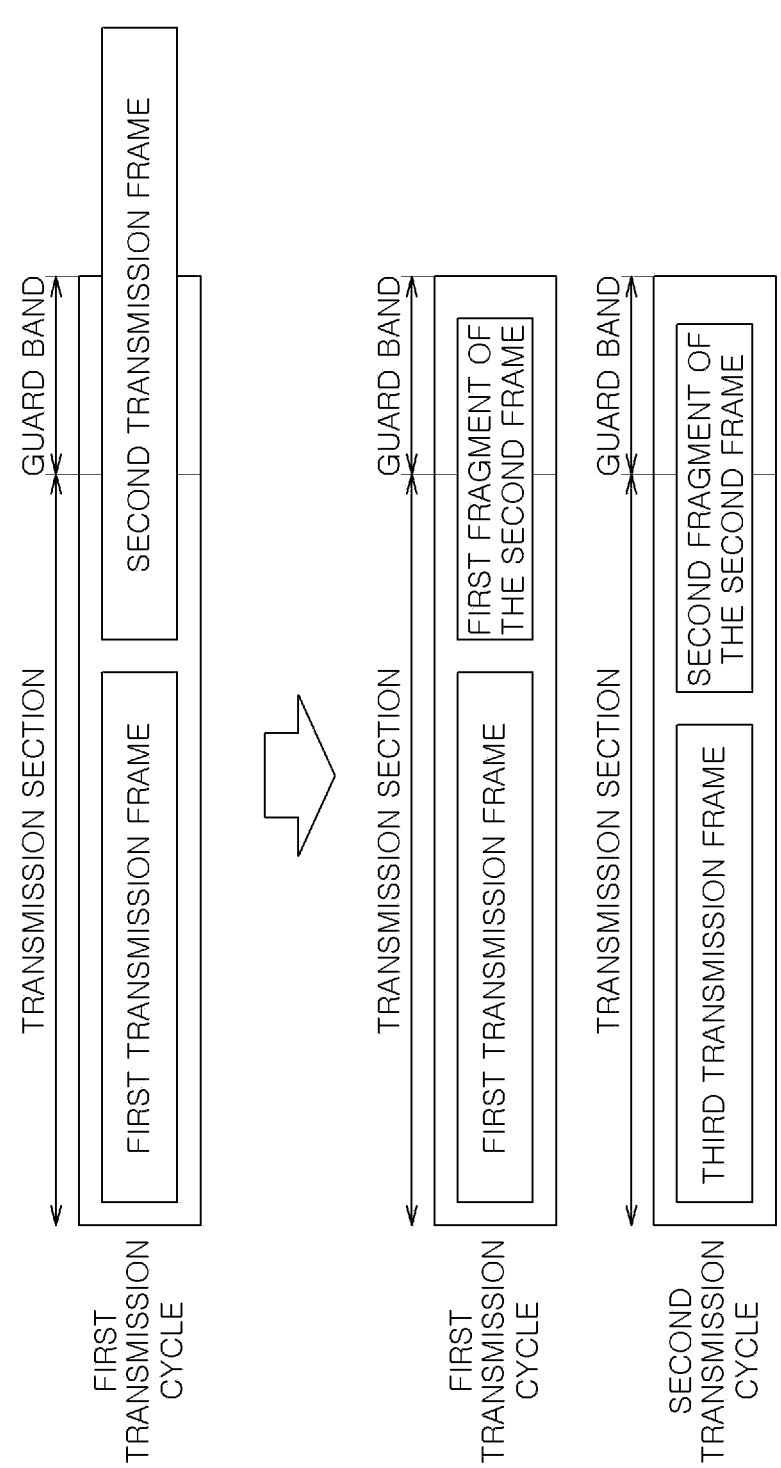

Meanwhile, as shown in FIG. 5, when the time required for transmitting the second transmission frame is longer than the remaining transmission time including the guard band, the gateway device may determine whether to perform preemption on the second transmission frame based on the priority of the data within the second transmission frame. For example, if the time required to transmit the second transmission frame is longer than the remaining transmission time and the priority of the data in the second transmission frame is higher than a set value, the gateway device may perform preemption on the second transmission frame. In other words, the gateway device may split the corresponding data into a plurality of fragments to form a plurality of fragment frames. In this case, the corresponding data may be more sensitive to time delay than general data (e.g., audio data or video data), and the priority of the data may be 2 or higher, for example. In other words, the priority of the corresponding data may be 2 to 7.

Figure 6:
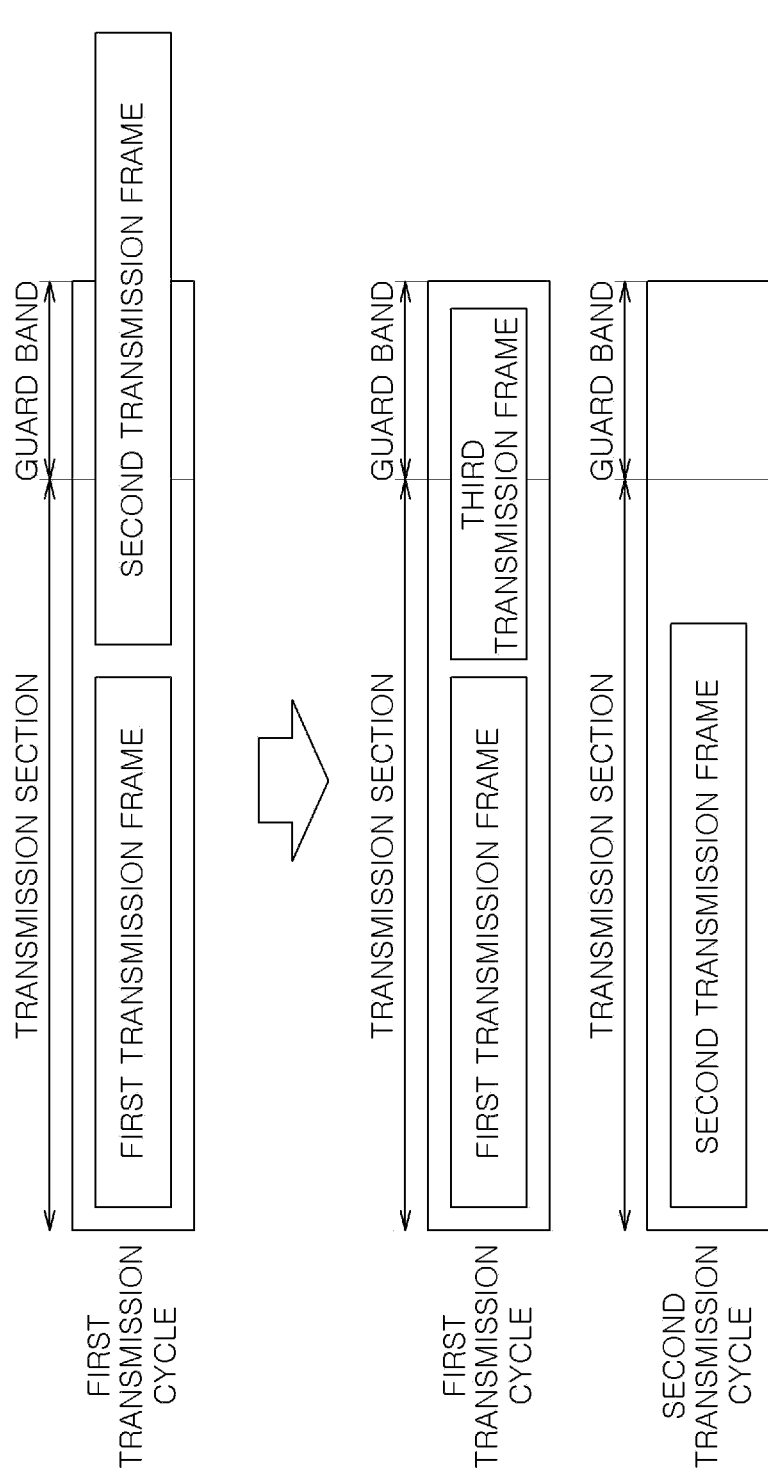

However, as shown in FIG. 6, if the time required for transmitting the second transmission frame is longer than the remaining transmission time including the guard band and the priority of the data in the second transmission frame is lower than the set value above, the gateway device may control the third transmission frame to be prioritized for transmission over the second transmission frame. In other words, the gateway device may transmit the third transmission frame in the remaining transmission time of the first transmission cycle and then transmit the second transmission frame in the transmission section of the second transmission cycle. In this case, the priority of the data in the third transmission frame may be lower than the set value, and the size of the data in the third transmission frame may be less than a first threshold. Here, the first threshold may be set based on the average size value of data for which preemption is performed. Data with a priority lower than the set value and a size less than the first threshold may be stored in a separate short buffer; when data with a priority lower than the set value may not be transmitted within the remaining transmission time of the current transmission cycle, the data in the short buffer may be prioritized for transmission over the corresponding data. In the example of FIG. 6, the priority of data in the second transmission frame and the priority of data in the third transmission frame may be lower than 2. In other words, the priority of the corresponding data may be 0 or 1.

Figure 7:
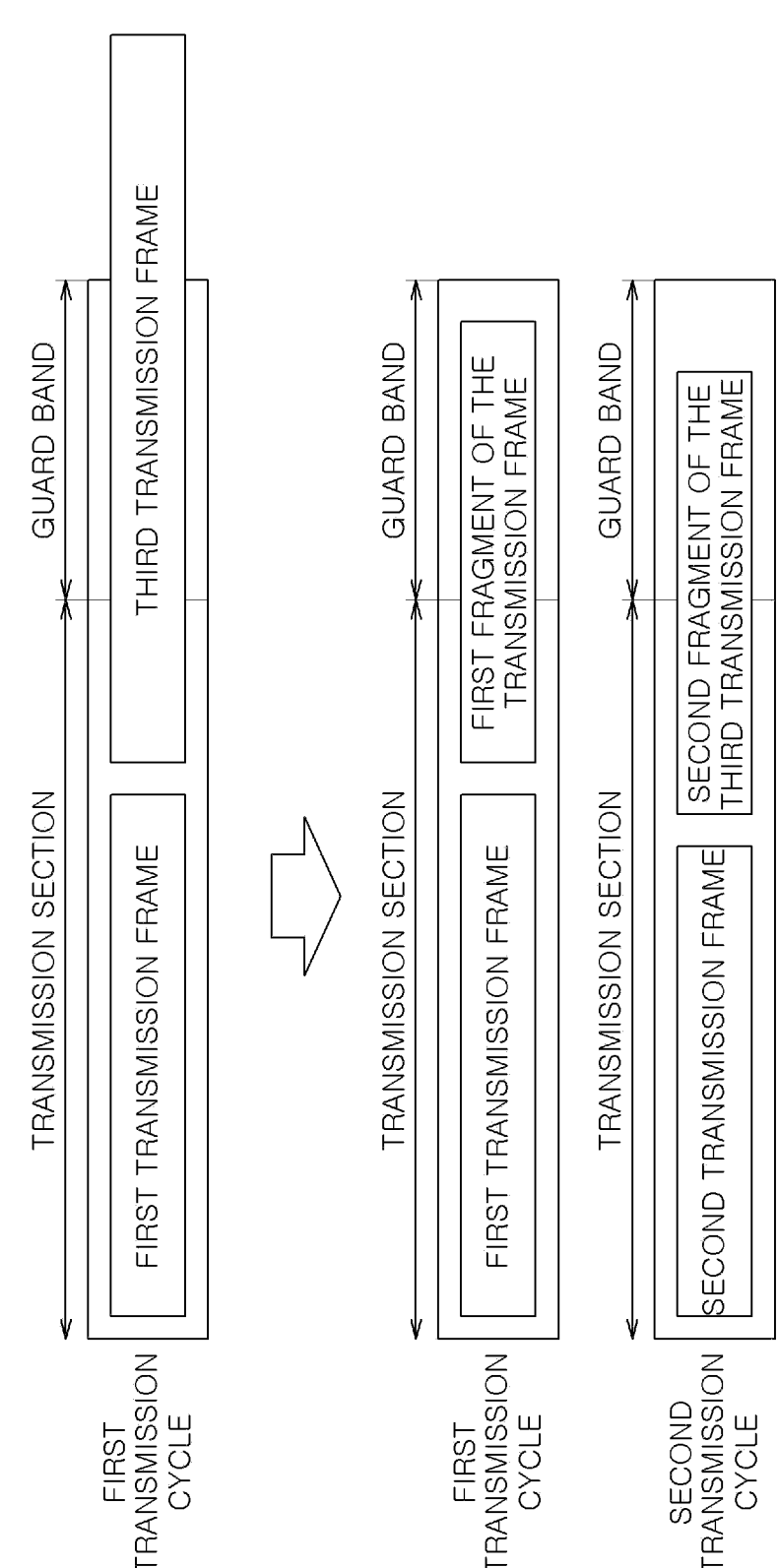

Meanwhile, referring to FIG. 7, during transmission of the third transmission frame in the remaining transmission time available after transmission of the first transmission frame within the first transmission cycle, if the remaining transmission time is shorter than the time required for transmitting of the third transmission frame, the gate device may determine whether to perform preemption on the third transmission frame by comparing the size of data in the third transmission frame with a second threshold. In this case, the second threshold may be set to at least 120 bytes. It is so because the minimum size of the data field in fragment frames configurable by frame preemption is 60 bytes, and one ethernet frame should be split into at least two fragment frames. For example, when frame preemption is applied to 120 bytes of data, the corresponding data may be transmitted through a first fragment frame and a second fragment frame, each of which containing a data field of 60 bytes, where the first fragment frame may consist of 90 bytes (=7+1+6+6+

4+2+60+4), and the second fragment frame may consist of 72 bytes (=6+1+1+60+4). Each fragment frame may have a size of at least 64 bytes.

If the size of the data in the third transmission frame is greater than or equal to the second threshold, the gateway device may transmit the first fragment frame of the third transmission frame in the remaining transmission time of the first transmission cycle by performing preemption on the third transmission frame and transmit the second fragment frame of the third transmission frame in the second transmission cycle. At this time, as shown in FIG. 7, in the transmission section of the second transmission cycle, the second transmission frame may be prioritized for transmission over the second fragment frame of the third frame, or the second fragment frame of the third frame may be prioritized for transmission over the second transmission frame according to a transmission schedule for fragment frames. Here, the second transmission cycle may be the next transmission cycle of the first transmission cycle or a transmission cycle at a particular time point after the first transmission cycle.

Figure 8:
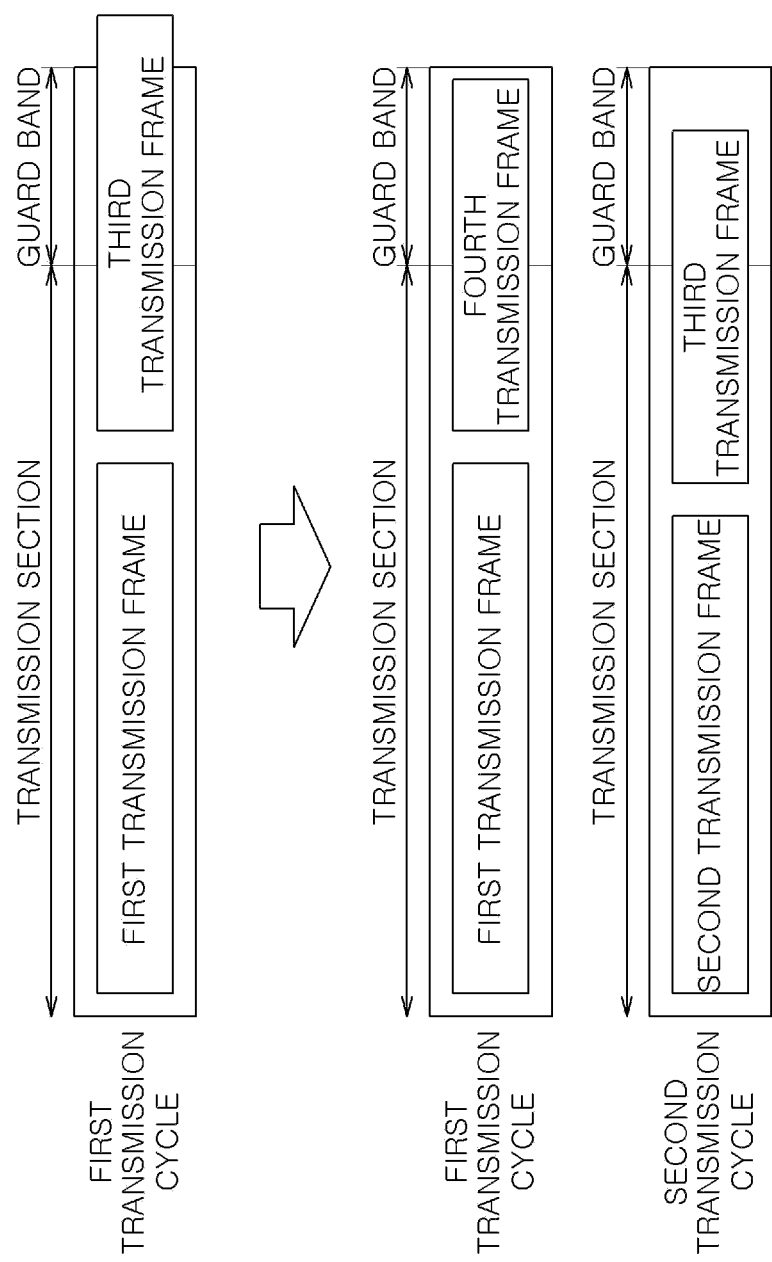

However, as shown in FIG. 8, if the size of data in the third transmission frame is less than the second threshold, namely, the size of data to be transmitted through the third transmission frame is smaller than the minimum data size obtained by splitting through frame preemption, the gateway device may transmit a fourth transmission frame, containing data with a size that may be transmitted in the remaining transmission time among data of which the sizes are less than the first threshold, before the third transmission frame and control the third transmission frame to be transmitted in the next transmission cycle of the current transmission cycle. At this time, as shown in FIG. 8, in the transmission section of the second transmission cycle, the second transmission frame may be prioritized for transmission over the third transmission frame, or the third transmission frame may be prioritized for transmission over the second transmission frame.

Figure 9:
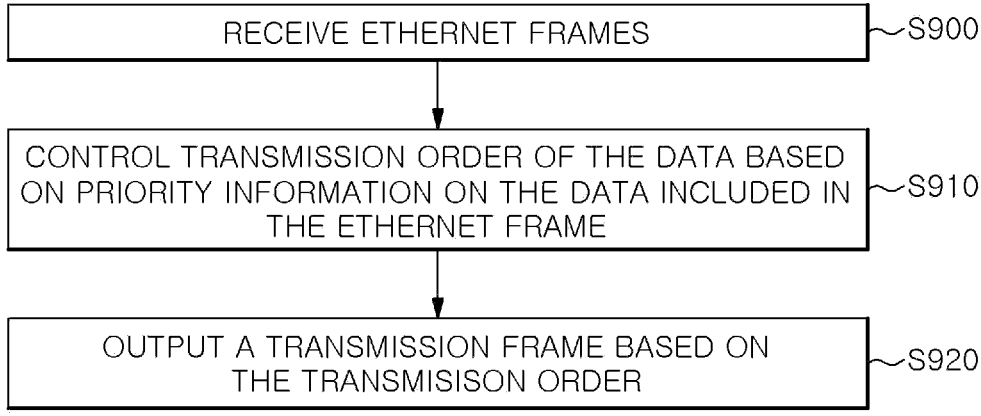
FIG. 9 illustrates a method for transmitting frames by a gateway device according to one embodiment of the present disclosure.

FIG. 9 illustrates a method for transmitting frames by a gateway device according to one embodiment of the present disclosure.

Referring to FIG. 9, the gateway device may receive ethernet frames from an external device S900. The gateway device may store the data in the ethernet frames received from the external device in an input buffer and increase a count value of the input buffer.

When an ethernet frames are received from the external device, the gateway device may control the transmission order of the data based on priority information for the data included in the ethernet frames S910. For example, the gateway device may monitor the count value of the input buffer and start a data classification task when the count value of the input buffer is greater than 0. At this time, based on the size of data in the input buffer and priority of the corresponding data, the gateway device may store the corresponding data in the corresponding buffer. Here, the buffer may include a control buffer, class A buffer, class B buffer, priority queuing (PQ) buffer, and short buffer. Control data may be stored in the control buffer, data with a priority corresponding to class A (e.g., audio data) may be stored in the class A buffer, data with a priority corresponding to class B (e.g., video data) may be stored in the class B buffer, and data with a priority corresponding to PQ (e.g., text data) may be stored in the PQ buffer. The priority of data may be highest for control data and lowest for PQ data. Data with a priority lower than the set value and with a size smaller than the first threshold may be stored in the short buffer. Here, the first threshold may be set based on the average value of the data size (or frame size) at which frame preemption occurs.

The gateway device may determine the transmission order for the data stored in each buffer through a data classification task. For example, the gateway device may calculate the remaining transmission time in the current transmission cycle and the time required to transmit the current frame (or data) and transmit the current frame if the frame transmission time is shorter than the remaining transmission time. However, if the transmission time of the current frame is longer than the remaining transmission time, the gateway device may check the status of the short buffer. If data exists in the short buffer and the time required for transmitting the data stored in the short buffer is shorter than the remaining transmission time, the gateway device may store the data stored in the short buffer in the output buffer and adjust the count value (the number of remaining data) and the frame transmission time of the short buffer.

For example, the gateway device may determine the remaining transmission time available after transmission of the first transmission frame in the current transmission cycle. If the time required for transmitting the second transmission frame is shorter than the remaining transmission time, the gateway device may transmit the second transmission frame within the current transmission period; if the time required for transmitting the second transmission frame is shorter than the remaining transmission time, the gateway device may determine whether to perform preemption on the second transmission frame based on the priority of data in the second transmission frame.

In one embodiment, if the time required for transmitting the second transmission frame is longer than the remaining transmission time and the priority of data in the second transmission frame is higher than a set value, the gateway device may perform preemption on the second transmission frame.

In another embodiment, if the time required for transmitting the second transmission frame is longer than the remaining transmission time and the priority of data in the second transmission frame is lower than the set value, the gateway device may prioritize the transmission of the third transmission frame over the second transmission frame. In this case, the priority of data in the third transmission frame may be lower than the set value, and the size of data in the third transmission frame may be less than a first threshold. Here, the first threshold may be set based on the average size value of the data for which preemption is performed. The priority of data within the second transmission frame and the priority of data within the third transmission frame may be the same.

Meanwhile, if the time required for transmitting the third transmission frame is shorter than the remaining transmission time, the gateway device may control the third transmission frame to be transmitted within the current transmission cycle; if the time required to transmit the third transmission frame is longer than the remaining transmission time, the gateway device may compare the size of the data within the third transmission frame with a second threshold to determine whether to preempt the third transmission frame. Here, the second threshold may be set to at least 120 bytes. If the size of data within the third transmission frame is greater than or equal to the second threshold, the gateway device may perform preemption on the third transmission frame; if the size of data within the third transmission frame is less than the second threshold, the gateway device may control the third transmission frame to be transmitted in the next transmission cycle of the current transmission cycle.

Figure 10:
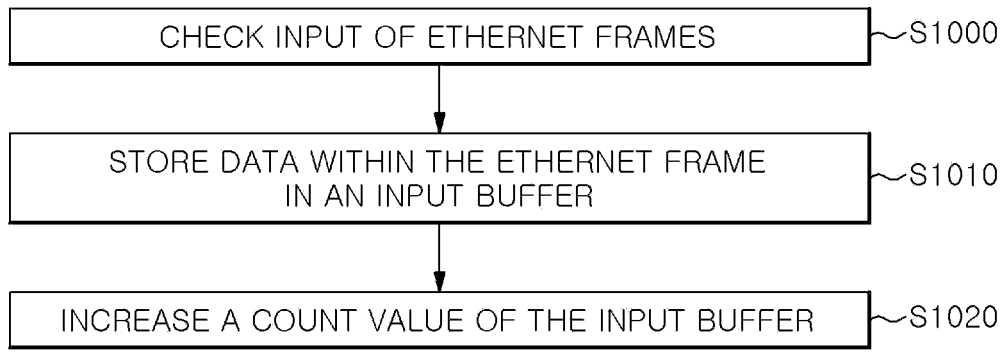
FIG. 10 illustrates a process of receiving data by a gateway device according to one embodiment of the present disclosure.

FIG. 10 illustrates a process of receiving data by a gateway device according to one embodiment of the present disclosure.

Referring to FIG. 10, when a frame (or a signal) is received from the outside, the gateway device may check whether an ethernet frame is input based on the header information of the corresponding frame S1000. If input of an ethernet frame is confirmed, the gateway device may store the data included in the ethernet frame in the input buffer S1010 and increase the count value of the input buffer S1020. The gateway device may check the number of data stored in the input buffer based on the count value of the input buffer.

Figure 11:
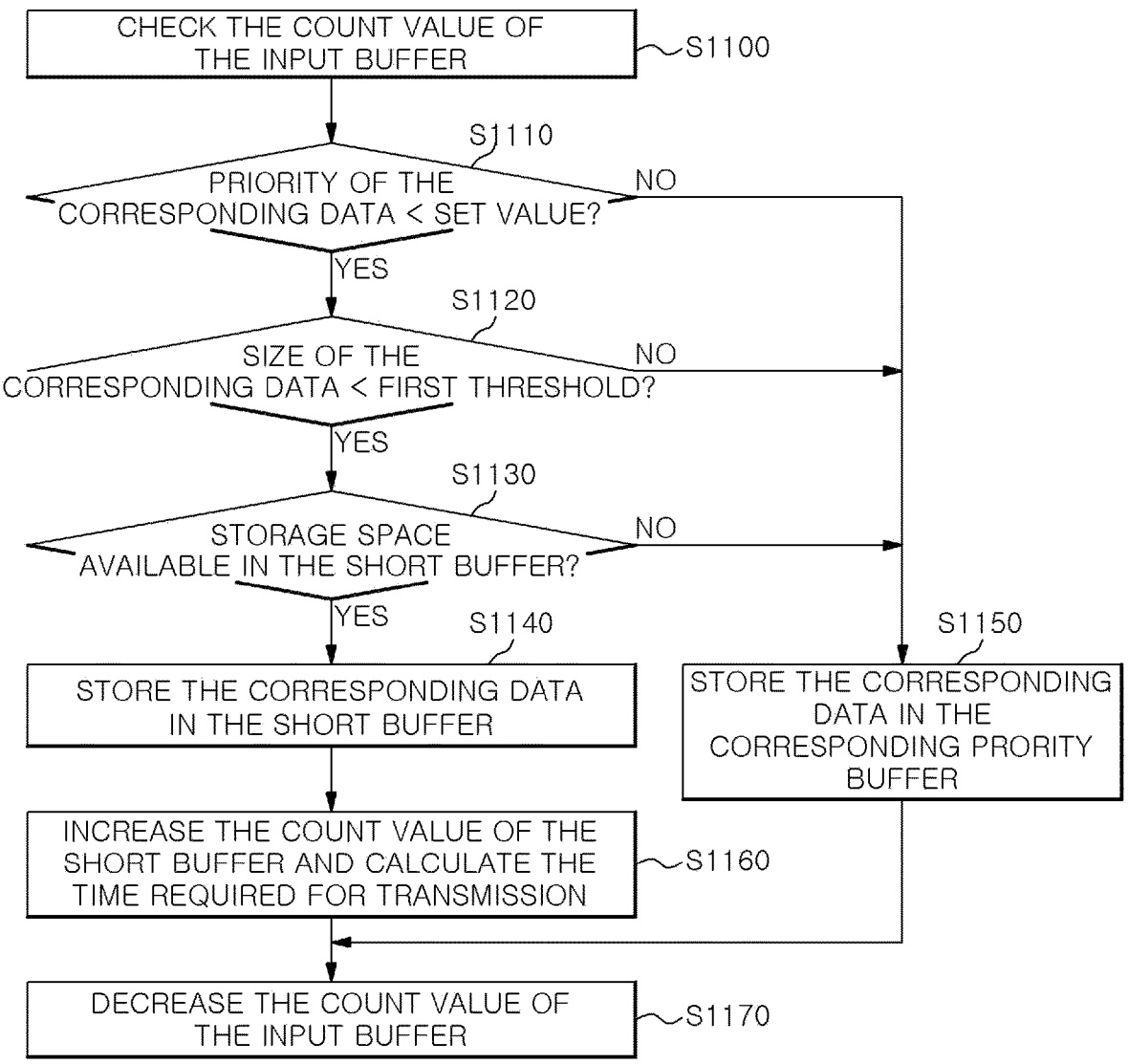
FIG. 11 illustrates a process of storing data by a gateway device according to one embodiment of the present disclosure.

FIG. 11 illustrates a process of storing data by a gateway device according to one embodiment of the present disclosure.

Referring to FIG. 11, the gateway device may monitor the input buffer and check the count value of the input buffer S1100. If the count value of the input buffer is greater than 0, the gateway device may compare the priority of each data in the input buffer with a set value S1110. If the priority of the corresponding data is lower than the set value, the gateway device may compare the size of the corresponding data with a first threshold S1120. If the size of the corresponding data is lower than the first threshold, the gateway device may check whether there is a storage space available in the short buffer S1130, and in the existence of an available storage space, the gateway device may store the corresponding data in the short buffer S1130. However, if the priority of the corresponding data is higher than or equal to the set value, the size of the data is greater than or equal to the first threshold, or there is no available storage space in the short buffer, the gateway device may store the corresponding data to the corresponding priority buffer S1150. Here, the priority buffer may include a control buffer for storing control data, a class A buffer for storing class A data, a class B buffer for storing class B data, and a PQ buffer for storing PQ data. The short buffer may store data with a size smaller than the average data size at which frame preemption occurs.

Afterward, the gateway device may increase the count value of the short buffer, store the corresponding data by calculating the time required for transmitting the corresponding data S1160, and decrease the count value of the input buffer S1170.

Figure 12:
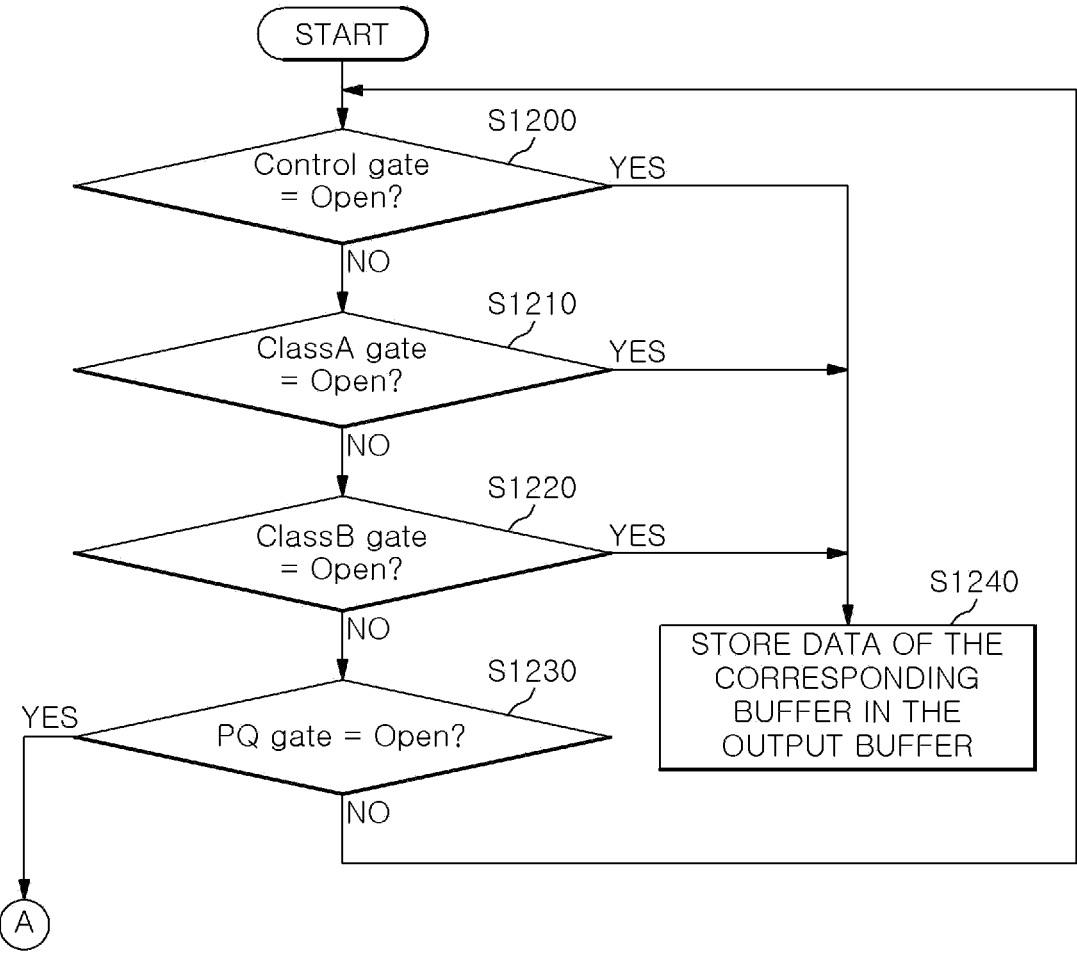
FIGS. 12 and 13 illustrate a process of processing data by a gateway device according to one embodiment of the present disclosure.
Figure 13:
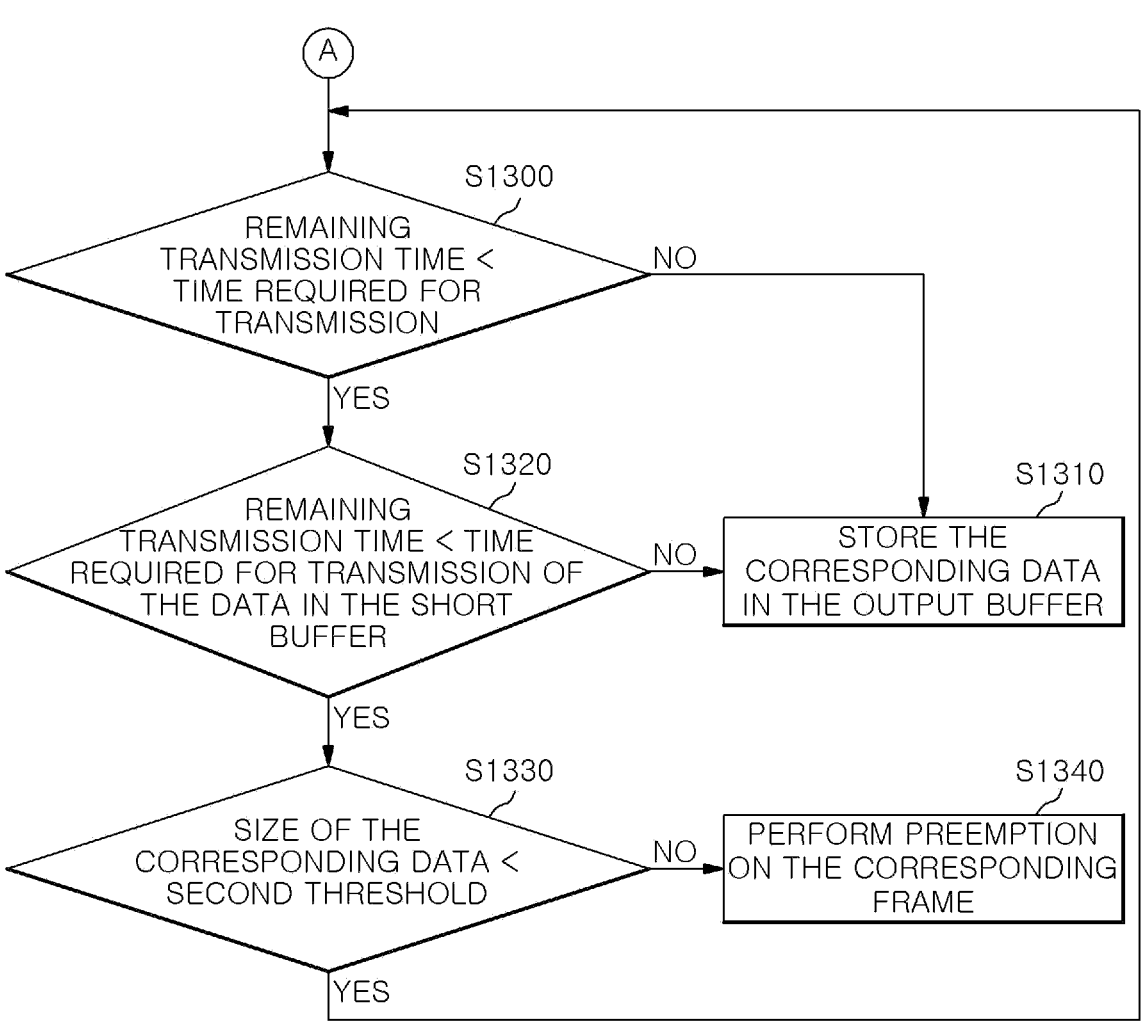

FIGS. 12 and 13 illustrate a process of processing data by a gateway device according to one embodiment of the present disclosure.

Referring to FIG. 12, each priority buffer may be connected to a gate that controls the output of the corresponding buffer (control buffer, class A buffer, class B buffer, and PQ buffer). The gateway device may check whether the gate of the control buffer is open S1200; if the corresponding gate is open, the gateway device may retrieve data from the control buffer and store the data in the output buffer S1240. If the gate of the control buffer is closed, the gateway buffer may check whether the gate of the class A buffer is open S1210; if the corresponding gate is open, the gateway device may retrieve data from the class A buffer and store the data in the output buffer S1240. If the gate of the class A buffer is closed, the gateway buffer may check whether the gate of the class B buffer is open S1220; if the corresponding gate is open, the gateway device may retrieve data from the class B buffer and store the data in the output buffer S1240. In the case of the PQ buffer, if the corresponding gate is open S1230, the gateway device may retrieve data from the PQ buffer and determine whether transmission is possible in the remaining transmission time of the current transmission cycle.

Specifically, referring to FIG. 13, the gateway device may calculate the remaining transmission time of the current transmission cycle (remaining time available for transmission) and the time required to transmit the corresponding data. If the time required for transmitting the corresponding data is shorter than the remaining transmission time S1300, the gateway device may store the corresponding data in the output buffer S1310. However, if the time required for transmitting the corresponding data is longer than the remaining transmission time, the gateway device may check whether data exists in the short buffer and compare the time required for transmitting the data in the short buffer with the remaining transmission time. If the time required for transmitting the data stored in the short buffer is shorter than the remaining transmission time S1320, the gateway device may store the corresponding data in the output buffer S1310 and decrease the count value of the short buffer. However, if the time required for transmitting the data stored in the short buffer is longer than the remaining transmission time, the gateway device may compare the size of the corresponding data with a second threshold. If the size of the corresponding data is greater than or equal to the second threshold S1330, the gateway device may perform preemption on the frame containing the corresponding data S1340; if the size of the corresponding data is less than the second threshold S1330, the gateway device may determine that preemption may not be performed on the corresponding data and determine whether other data in the short buffer may be transmitted within the remaining transmission time. Among the data obtained from splitting by preemption, remaining data not transmitted in the remaining transmission time may be stored again in the PQ buffer or short buffer.

The gateway device may monitor the number of frames stored in the output buffer; if input of a frame is confirmed, the gateway device may output the corresponding frame to the ethernet port.

Meanwhile, each processing step included in the transmission method performed by the gateway device according to the embodiment above may be implemented in the form of a computer program stored in a recording medium, which includes instructions that instruct a processor to execute the processing step.

Also, each processing step included in the transmission method performed by the gateway device according to the embodiment above may be implemented in a computer-readable recording medium storing a computer program which includes instructions that instruct a processor to execute the processing step. Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A gateway device comprising:
a communication unit configured to transmit and receive a plurality of ethernet frames including a plurality of ethernet data;
a memory configured to store one or more instructions; and
a processor configured to execute the one or more instructions stored in the memory, wherein the instructions, when executed by the processor, cause the processor to:
check priority information on each ethernet data included in the plurality of ethernet frames;
determine a first ethernet frame with the highest priority and a second ethernet frame with a priority lower than that of the first ethernet frame among the plurality of ethernet frames based on the priority information, transmit the first ethernet frame in a first transmission cycle;
control the second ethernet frame to be transmitted in the first transmission cycle when time required for transmitting the second ethernet frame is shorter than the remaining time obtained after transmission of the first ethernet frame in the first transmission cycle; and
determine whether to perform preemption of the second ethernet frame based on priority information of the ethernet data of the second ethernet frame when the time required for transmitting the second ethernet frame is longer than the remaining time of the first transmission cycle,
wherein, when the time required for transmitting the second ethernet frame is longer than the remaining time of the first transmission cycle and the priorities of the ethernet data of the second and third ethernet frames are lower than a predetermined value, the processor is configured to transmit the third ethernet frame before transmitting the second ethernet frame as the time required for transmitting the third ethernet frame is shorter than a predetermined first threshold.

2. The gateway device of claim 1, wherein the predetermined first threshold is set based on an average value of data size at which the preemption occurs.

3. The gateway device of claim 1, wherein the priority of the ethernet data of the second ethernet frame is the same as the priority of the ethernet data of the third ethernet frame.

4. The gateway device of claim 1, wherein, when the time required for transmitting the third ethernet frame is shorter than the remaining time of the first transmission cycle, the processor is configured to control the third ethernet frame to be transmitted within the first transmission cycle, and
when the time required for transmitting the third ethernet frame is longer than the remaining time of the first transmission cycle, the processor is configured to compare the time required for transmitting the third ethernet frame with a predetermined second threshold and determines whether to perform preemption of the third ethernet frame.

5. The gateway device of claim 4, wherein the predetermined second threshold is set to at least 120 bytes.

6. The gateway device of claim 4, wherein the processor is configured to perform the preemption of the third ethernet frame when the time required for transmitting the third ethernet frame is longer than or equal to the predetermined second threshold, and
control the third ethernet frame to be transmitted in a transmission cycle after the first transmission cycle when the time required for transmitting the third ethernet frame is shorter than the predetermined second threshold.

7. A data transmission method performed by a gateway device including a memory and a processor, the method comprising:
receiving a plurality of ethernet frames including ethernet data;
determining a first ethernet frame with the highest priority and a second ethernet frame with a priority lower than that of the first ethernet frame among the plurality of ethernet frames based on priority information on each ethernet data included in the plurality of ethernet frames;
transmitting the first ethernet frame including the first ethernet data in a first transmission cycle; and
transmitting the second ethernet frame including the second ethernet data,
wherein the transmitting the second ethernet data includes:
controlling the second ethernet frame to be transmitted in the first transmission cycle when time required for transmitting the second ethernet frame is shorter than the remaining time obtained after transmitting the first ethernet frame in the first transmission cycle, and
determining whether to perform preemption of the second ethernet frame based on priority information of the ethernet data of the second ethernet frame when the time required for transmitting the second ethernet frame is longer than the remaining time of the first transmission cycle,
wherein the method further comprises:
determining a third ethernet frame with a priority lower than that of the first ethernet frame among the plurality of ethernet frames; and transmitting the third ethernet frame, wherein the transmitting the third ethernet frame includes, when the time required for transmitting the second ethernet frame is longer than the remaining time of the first transmission cycle and the priorities of the ethernet data of the second and third ethernet frames are lower than a predetermined value, transmitting the third ethernet frame before transmitting the second ethernet frame as the time required for transmitting the third ethernet frame is shorter than a predetermined first threshold.

8. The data transmission method of claim 7, wherein the predetermined first threshold is set based on an average value of data size at which the preemption occurs.

9. The data transmission method of claim 7, wherein the priority the ethernet data of the second ethernet frame is the same as the priority of the ethernet data of the third ethernet frame.

10. The data transmission method of claim 7, wherein the transmitting the third ethernet frame includes:

controlling the third ethernet frame to be transmitted within the first transmission cycle when the time required for transmitting the third ethernet frame is shorter than the remaining time of the first transmission cycle and comparing the time required for transmitting the third ethernet frame with a predetermined second threshold and determining whether to perform preemption of the third ethernet frame when the time required for transmitting the third ethernet frame is longer than the remaining time of the first transmission cycle.

11. The data transmission method of claim 10, wherein the predetermined second threshold is set to at least 120 bytes.

12. The data transmission method of claim 10, wherein the transmitting the third ethernet frame includes:

performing the preemption of the third ethernet frame when the time required for transmitting the third ethernet frame is longer than or equal to the predetermined second threshold, and controlling the third ethernet frame to be transmitted in a transmission cycle after the first transmission cycle when the time required for transmitting the third ethernet frame is shorter than the predetermined second threshold.

13. A non-transitory computer readable storage medium storing computer executable instructions, wherein the instructions, when executed by a processor, cause the processor to perform a data transmission method, the method comprising:

receiving a plurality of ethernet frames including ethernet data;

storing each of the plurality of ethernet data according to priorities of a plurality of buffers based on priority information on each ethernet data included in the plurality of ethernet frames;

transmitting a first ethernet frame including ethernet data stored in a first buffer with the highest priority among the plurality of buffers within a first transmission cycle; and transmitting a second ethernet frame including ethernet data stored in a second buffer with a priority lower than that of the first buffer among the plurality of buffers, wherein the transmitting the second frame buffer includes:

controlling the second ethernet frame to be transmitted in the first transmission cycle when time required for transmitting the second ethernet frame is shorter than the remaining time obtained after transmitting the first ethernet frame in the first transmission cycle, and determining whether to perform preemption of the second ethernet frame based on the size of ethernet data stored in the second buffer when the time required for transmitting the second ethernet frame is longer than the remaining time, wherein the method further comprises:

determining a third ethernet frame with a priority lower than that of the first ethernet frame among the plurality of ethernet frames; and transmitting the third ethernet frame, wherein the transmitting the third ethernet frame includes, when the time required for transmitting the second ethernet frame is longer than the remaining time of the first transmission cycle and the priorities of the ethernet data of the second and third ethernet frames are lower than a predetermined value, transmitting the third ethernet frame before transmitting the second ethernet frame as the time required for transmitting the third ethernet frame is shorter than a predetermined first threshold.

14. The non-transitory computer readable storage medium of claim 13, wherein the predetermined first threshold is set based on an average value of data size at which the preemption occurs.

* * * * *